United States Patent [19]
Kubota

[11] Patent Number: 5,715,575
[45] Date of Patent: Feb. 10, 1998

[54] HINGE DEVICE

[75] Inventor: Naoki Kubota, Kashiwazaki, Japan

[73] Assignee: Kato Spring Works Co., Ltd., Tokyo, Japan

[21] Appl. No.: 607,471

[22] Filed: Feb. 27, 1996

[30] Foreign Application Priority Data

Mar. 13, 1995 [JP] Japan ............... 7-053050

[51] Int. Cl.$^6$ ............... E05C 17/64
[52] U.S. Cl. ............... 16/342; 16/336
[58] Field of Search ............... 16/342, 337, 341, 16/335, 336, 386

[56] References Cited

U.S. PATENT DOCUMENTS

| | | | |
|---|---|---|---|
| 2,622,922 | 12/1952 | Schroeder | 16/342 |
| 3,600,743 | 8/1971 | Meadows. | |
| 4,114,236 | 9/1978 | Vandervort | 16/335 |
| 4,785,500 | 11/1988 | Langridge | 16/341 |
| 4,841,599 | 6/1989 | Cebollero | 16/342 |
| 5,052,078 | 10/1991 | Hosoi | 16/342 |
| 5,237,488 | 8/1993 | Moser et al. | 16/386 |
| 5,364,149 | 11/1994 | Aymerich et al. | 16/342 |

FOREIGN PATENT DOCUMENTS

| | | |
|---|---|---|
| 8904737.0 | 7/1989 | Germany. |
| 57-54891 | 9/1955 | Japan. |
| 3-95482 | 9/1991 | Japan. |
| 5-83443 | 11/1993 | Japan. |
| 409692 | 10/1966 | Switzerland. |

*Primary Examiner*—Chuck Y. Mah
*Attorney, Agent, or Firm*—Scully, Scott, Murphy & Presser

[57] ABSTRACT

The present invention provides a hinge device which permits opening and closing operations to be carried out smoothly and with surety, and which contributes to the design of a more compact device. The hinge device, wherein a transmitter is connected to one lateral edge of an operational member in a freely opening and closing manner, comprises two hinge device main bodies. These hinge device main bodies are disposed to either end of the lateral edge along the longitudinal direction thereof, and are provided with a cam shaft and a spring respectively. The cam shaft is affixed to the operating member by positioning the axis thereof parallel to the lateral edge. In addition, the cam shaft is provided with a cam portion at its axis periphery. A spring is affixed to the transmitter, and the cam portion of the cam shaft is elastically held.

5 Claims, 14 Drawing Sheets

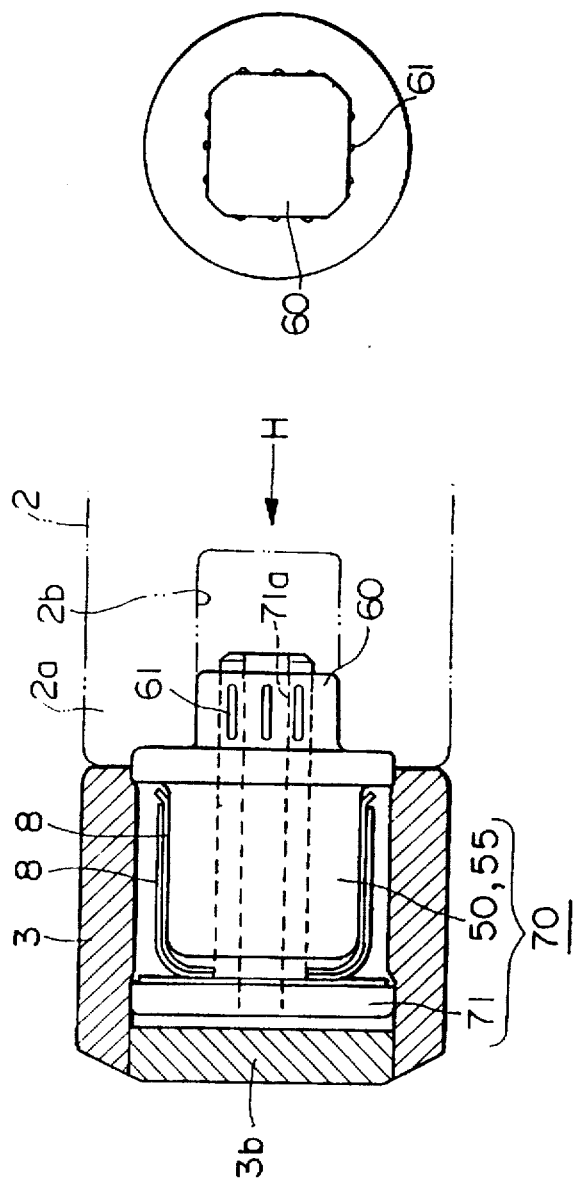

HINGE DEVICE

BACKGROUND OF THE INVENTION

1. Field of the Invention

The present invention relates to a hinge device that is ideal for use in electronic devices such as cellular phones, laptop computers, electronic datebooks and the like, which enables such devices to be closed shut when not in use, or opened to a specific angle by folding open one portion of the device such as, for example, the transmitter in the case of a cellular telephone, or the display in the case of a laptop computer.

2. Description of the Related Art

Various types of compact information devices such as cellular telephones, laptop computers and electronic datebooks equipped with liquid crystal displays and the like have been developed and put into general use with the advance in electronics technology in recent years. These devices are principally composed of two parts which open and close freely. When the device is not in use, its two parts may be folded closed to permit compact storage of the device. In contrast, when use of the device is desired, one member, such as the telephone transmitter, computer display or the like, is folded open to a specific angle.

In an information device having this kind of opening method, a hinge device is employed as the connection between the member which is moved to open or shut the device and the member which remains fixed or stationary (hereinafter, the member portion which is moved to open or close the device, i.e., the telephone transmitter or the laptop display, will be referred to as the "opening-closing member", while the portion of the device which remains stationary or is held in a fixed position will be referred to as the "stationary member"). The hinge device is disposed along the lateral edge of the stationary member to which the opening-closing member is connected. The two members of the device are joined along the entire region of connection between their two edges.

Information devices which open and close in this manner are frequently intended for portable use, thus it is desirable that the device be compact. However, conventional hinge devices as described above, wherein the hinge forms one portion of the device, are problematic in that it is necessary to devote the entire lateral edge of the stationary member to which the moveable member is attached for use as the region of connection between the two members. Accordingly, a more compact hinge device has been desired in order to facilitate the development of a smaller and more readily portable device.

SUMMARY OF THE INVENTION

The present invention was conceived in consideration of the aforementioned circumstances, and has as an objective the provision of a hinge device whereby the opening and closing operations can be carried out smoothly and with surety, this hinge device contributing to making the electronic device more compact. Further, it is also an objective of the present invention to provide a hinge device which improves the esthetic appearance of the electronic device in which it is employed by providing a space for housing wiring or the like.

The present invention employs the following design in order to resolve the problems described above.

Namely, in the hinge device of the present invention, the opening-closing member of an electronic device is connected to one lateral edge of the stationary member in a manner to permit free opening and closing thereof. This hinge device has two main bodies which are disposed respectively at either end of the aforementioned lateral edge of the stationary member, along the longitudinal direction thereof. These hinge main bodies are each provided with a cam shaft and spring. This cam shaft is affixed to one of the stationary member and the opening-closing member by positioning the axis of the cam shaft parallel to the lateral edge of the stationary member, and has a cam at its axis periphery. The spring is affixed to one of the opening-closing member and the stationary member to which the cam shaft is not affixed, and is characterized in that it elastically grips the cam of the cam shaft.

Further, the cam is provided with a pair of holding surfaces which are disposed symmetrically about the aforementioned axis, at which the cam is held in a predetermined position by the spring.

These holding surfaces are flat surfaces or inwardly depressed surfaces to form concave surfaces.

The holding surfaces may be lenticulated, in a triangular wave shape or the like, or their circumscribed enveloping surfaces may be flat or indented inward, without impinging on their function, such that the cam can be held in a predetermined position.

Further, the cam is characterized in that the edges of the pair of holding surfaces are joined in a state such that they project outward to form a convexity, with a pair of curved surfaces being disposed symmetrically about the aforementioned axis.

Moreover, these curved surfaces are provided with reset force receiving surfaces. When the cam is rotated relative to the spring, this reset force receiving surface receives a rotational force storing as the elastic restorativity in the spring to rotate it in a direction opposite to the rotation of the cam.

Further, this reset force receiving surface is an arced surface having a center line which is eccentric from the axis of the cam.

Moreover, the two cams which are disposed at either end of the aforementioned lateral edge differ from each other with respect to their shape in cross-section.

Further, one of the two cams is the principal holding cam which is held in a predetermined position by the spring, while the other cam is the principal reset cam upon which the elastic restorative force of the spring acts.

Moreover, a through hole which passes through the axis is formed in the cam shaft.

BRIEF DESCRIPTION OF THE DRAWINGS

FIG. 20A is a front view and FIG. 20B is a lateral view viewed from the direction indicated by an arrow H in FIG. 20A showing an alternative example of the cam shaft in the hinge device of the present invention.

DESCRIPTION OF THE PREFERRED EMBODIMENTS

An explanation will now be made of the preferred embodiments of the present invention will reference being given to the figures.

Embodiment 1

Figure 1:
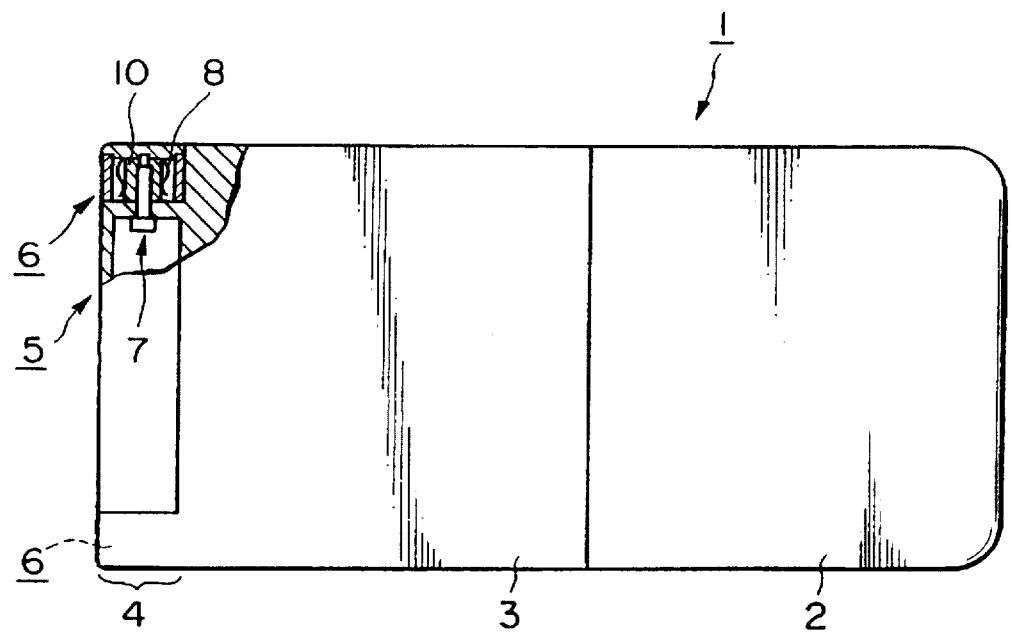
FIG. 1 is a planar view of an example of a cellular telephone employing a first embodiment of the hinge device of the present invention.
Figure 2:
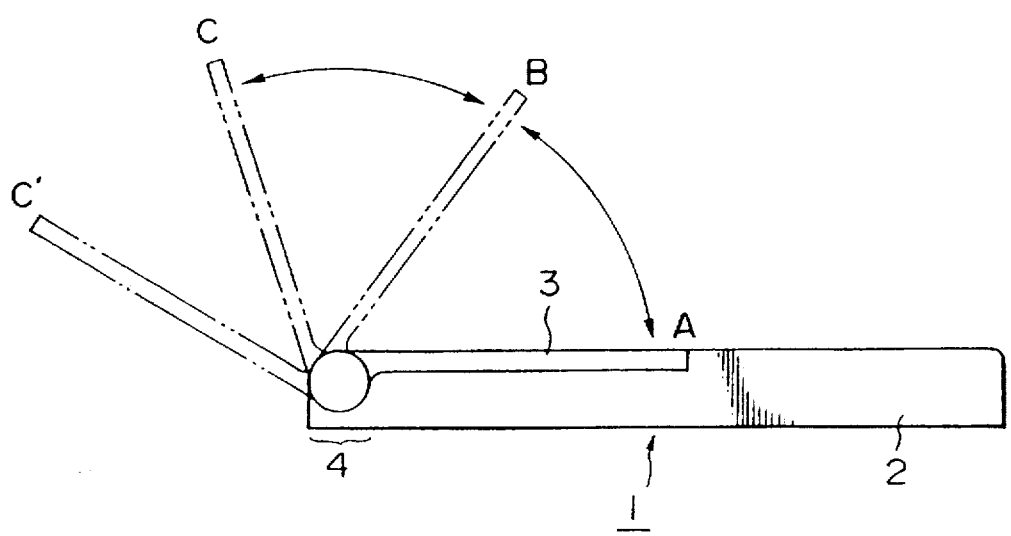
FIG. 2 is a front view of the cellular telephone, with the letters A, B, C and C' indicating different positions of the opening-closing member thereof during the opening and closing operations.

FIGS. 1 and 2 show examples of a cellular telephone employing a first embodiment of the hinge device of the present invention. This cellular telephone 1 is principally composed of an operational member 2 (stationary member) and a transmitter 3 (opening-closing member). Transmitter 3 is connected to a lateral edge 4 of operational member 2 in a manner so as to open and close freely. This connection is achieved by means of hinge device 5. Hinge device 5 comprises two hinge device main bodies 6,6. These hinge device main bodies 6,6 are disposed to either end of lateral edge 4 along the longitudinal direction thereof.

Next, a detailed explanation will be made of the structure of hinge device main body 6 with reference being given to FIGS. 3 and 4.

In the figures, hinge device main body 6 is principally composed of cam shaft 7 and spring 8. Cam shaft 7 is formed of a metallic shaft 9 and a synthetic resin cam 10, for example. Shaft 9 is fixed to attached wall 2a of operational member 2, by positioning its axis parallel to lateral edge 4. Cam 10 is fixed around the axis of shaft 9. Shaft 9 has three axis regions, 9a, 9b, and 9c, which differ in diameter and are disposed in order of size. Pairs of flat portions 9d,9d and 9e,9e are formed symmetrically to axis regions 9b and 9c respectively, parallel to the axis. Axis region 9b is inserted into hole 2b of attached wall 2a, and flat portions 9d,9d catch on and are stopped by the inside wall of hole 2b to prevent the rotation of the axis periphery. Further, axis 9a is inserted into a hole 11a formed in lid 11 (explained below) such that play is permitted therebetween.

Further, cam 10 has a hole 10a which is formed to conform with the shape of axis regions 9a and 9b. As is shown by its external shape in cross-section in FIG. 5, cam 10 is comprised of a pair of holding surfaces 10b,10b, which are parallel to and symmetrically disposed about the cam axis, and a pair of arced surfaces 10c,10c (curved surfaces), which are disposed symmetrically about the axis and are joined to the edges of holding surfaces 10b,10b, forming a convexly curving surface therebetween. Further, as shown in FIGS. 3 and 4, shaft 9 is fixed in position by positioning axis regions 9a,9b inside hole 10a.

Figure 3:
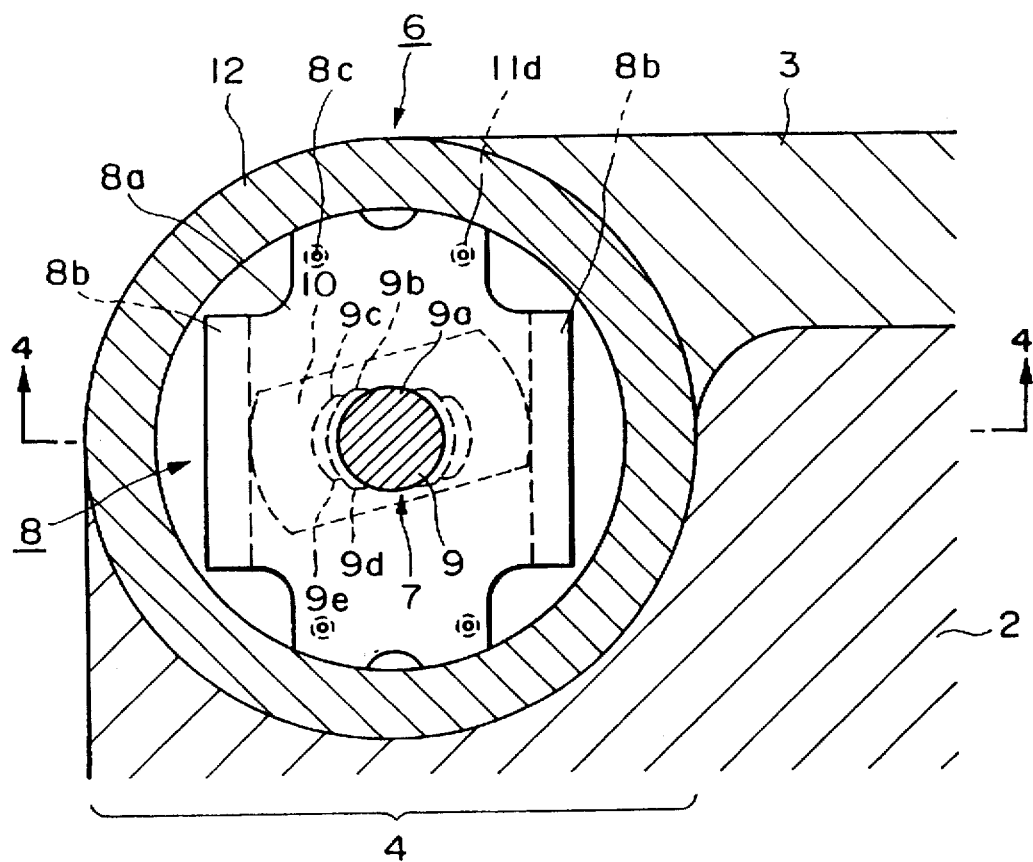
FIG. 3 is a side view showing the main body of the hinge device according to the first embodiment of the present invention, this figure showing the hinge device main body in cross-section along the line Y—Y shown in FIG. 4.
Figure 4:
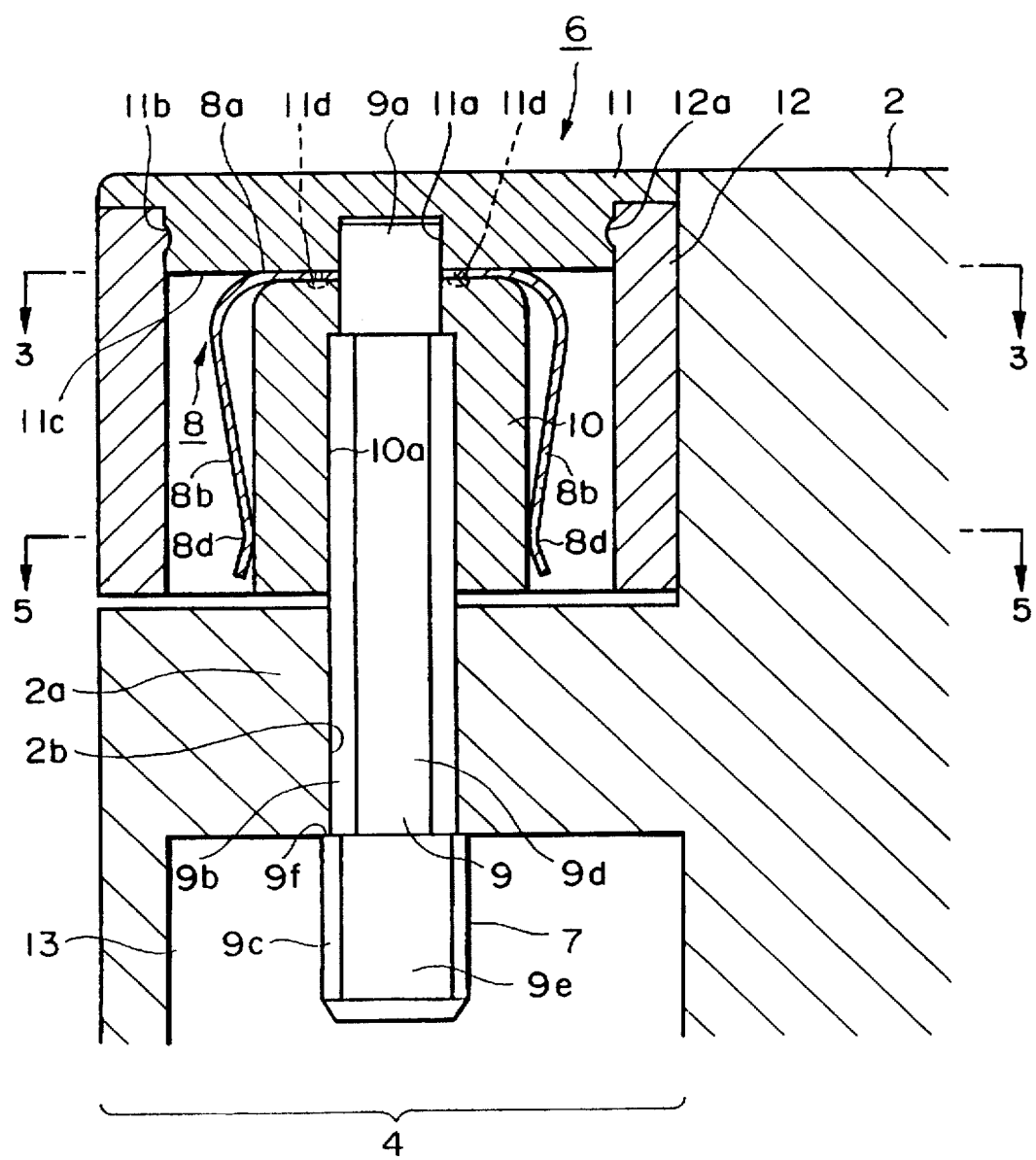
FIG. 4 is a planar view of the hinge device main body, shown in cross-section along the line X—X shown in FIG. 3.

In FIGS. 3 and 4, ring shaped member 12 is fixed to transmitter 3. Lid 11 is fixed to ring shaped member 12 through an engagement between a plurality of concavities 11b formed in lid 11 and a plurality of projections 12a formed to the inner peripheral surface of ring shaped member 12. Hole 11a and projections 11d are formed to the inner surface 11c of lid 11. Axis region 9a of the cam shaft engages inside hole 11a as described above. Spring 8 has a roughly cross-shaped flat plate 8a, with upright walls 8b,8b provided extending from the ends thereof. Holes 8c are formed in flat plate 8a of spring 8 in positions so as to match projections 11d of lid 11. Projections 11d and holes 8c engage to fix spring 8 to lid 11. Because spring 8 is fixed to lid 11, it is indirectly fixed to transmitter 3 via lid 11 and ring shaped member 12. Further, upright walls 8b,8b contact cam 10 via contact portions 8d,8d, elastically gripping cam 10.

Next, an explanation will be made of the assembly of the hinge device main body 6 shown in FIGS. 3 and 4.

First, the shaft 9 of cam shaft 7 is inserted into hole 2b via a space located in the center of lateral edge 4 of operational member 2. The forward insertion of shaft 9 is stopped by the wall portions 9f of axis region 9c. Further, flat portions 9d,9d of axis region 9b are stopped by the inner wall of the hole 2b preventing rotation of the rotation axis thereof. Next, the cam portion 10 is inserted into shaft 9 from the outside of edge 4 of operational member 2 so that axis regions 9a,9b of shaft 9 are inserted into hole 10a. Spring 8 is fixed to lid 11 in advance by engaging projections 11d with holes 8c. Lid 11 is fixed to ring shaped member 12, to which transmitter 3 was fixed in advance, by engaging projections 12a with concavities 11b. In this case, contact portion 8d of spring 8, which is fixed to lid 11, grips cam 10 of cam shaft 7, while axis region 9a of cam shaft 7 is engaged inside hole 11a of lid 11. By means of the preceding operations, then, the assembly of the hinge device main body 6 is completed.

Next, an explanation will be now made of the opening and closing operation of transmitter 3 attached to the operational member of cellular phone 1 by means of hinge device 5.

Figure 5:
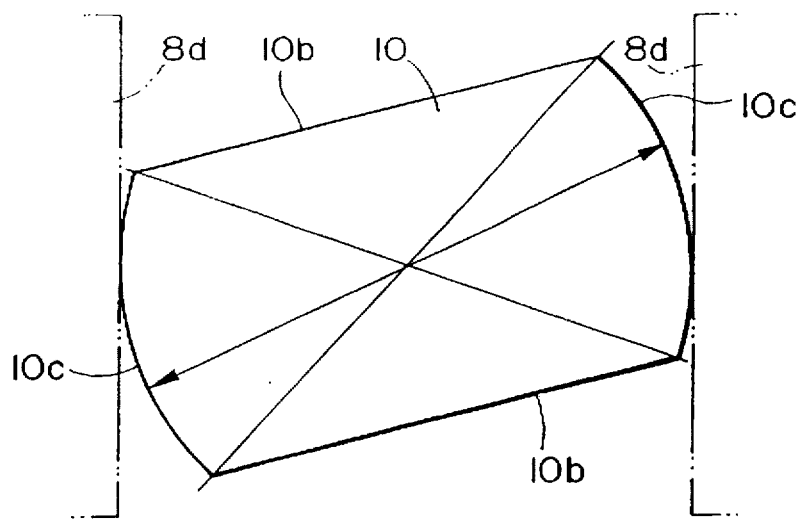
FIG. 5 is an explanatory view showing the external shape of the cam in the hinge device main body, shown in cross-section along the line Z—Z shown in FIG. 4. This figure corresponds to the position of the opening-closing member indicated by A in FIG. 2.
Figure 6:
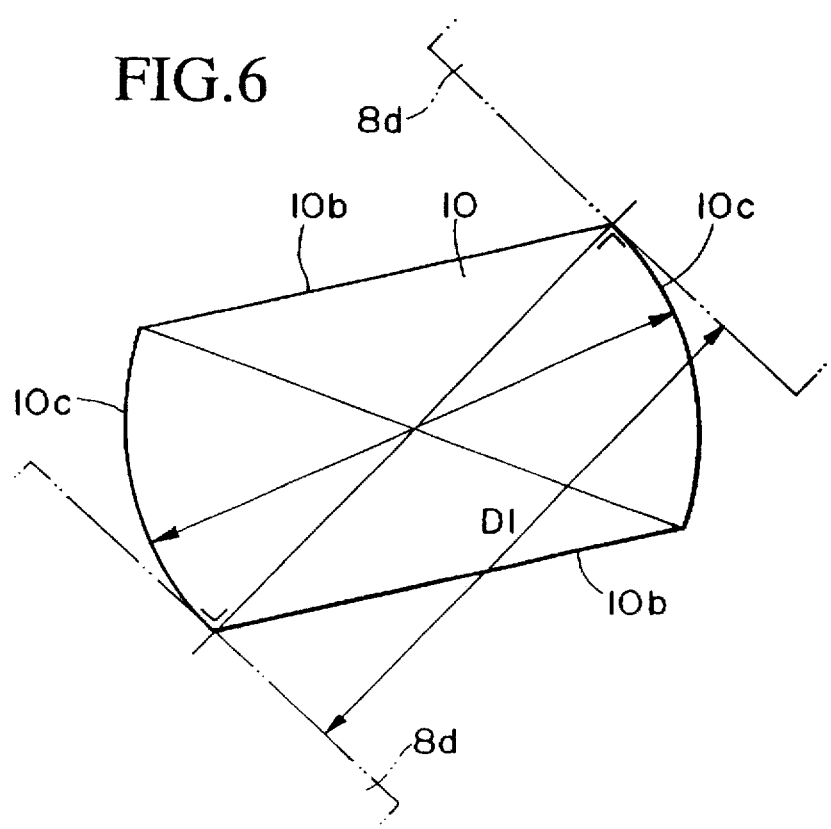
FIG. 6 is an explanatory view showing the positional relationship between the cam and the spring for the cam shown in FIG. 5. This figure corresponds to position B in FIG. 2.
Figure 7:
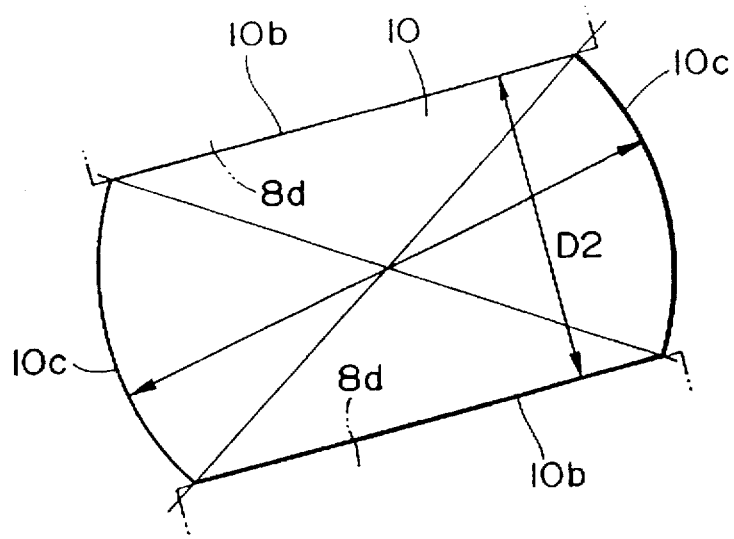
FIG. 7 is an explanatory view showing the positional relationship between the cam and the spring in the same cam. This figure corresponds to position C in FIG. 2.

In the proceeding explanation, FIGS. 5, 6, and 7 respectively depict the positional relationship between spring 8 and cam 10 of cam shaft 7 at the time when transmitter 3 is at each of the positions indicated by the letters A, B, and C in FIG. 2. A separate explanation will be made for each stage of the opening and closing process of transmitter 3.

(1) Position A (device closed)

When cellular telephone 1 is closed, namely transmitter 3 is at position A shown in FIG. 2, contact portions 8d,8d are in contact with cam 10 at the central portion of arced surfaces 10c,10c, such that cam 10 is gripped therebetween, as shown in FIG. 5.

(2) Transition from position A to position B (opening)

In beginning to open closed transmitter 3, namely moving transmitter 3 to position B (corresponding to FIG. 6), spring 8 is rotated in a counter-clockwise direction as contact portions 8d,8d remain contact with arced surfaces 10c,10c, gripping cam 10 therebetween. The curving arc shape of arced surface 10c enables rotation to be smoothly performed at this point.

(3) Transition from position B to position C (opening)

When transmitter 3 is opened further beyond position B (corresponding to FIG. 6), contact portions 8d,8d move from a state of linear contact with arced surfaces 10c,10c to a state of planar contact with holding surfaces 10b,10b shown in FIG. 7. This transition from the state shown in FIG. 6 to that shown in FIG. 7 is carried out in a single movement by means of only a slight amount of force. In other words, transition of the transmitter to position C occurs suddenly by application of only a slight rotational force when the transmitter is at position B.

(4) Position C (open)

When transmitter 3 is at position C (corresponding to FIG. 7), contact portions 8d,8d grip holding surfaces 10b,10b by means of planar contact therewith, such that transmitter 3 can be held open at a specific angle with surety and stability.

(5) Transition from position C to B (closing)

In order to close transmitter 3 from position C (corresponding to FIG. 7), a large amount of rotational force is required in response to the extension in the distance between contact portions 8d,8d from the length D2 shown in FIG. 7 to the length D1 shown in FIG. 6. Since the required force corresponds to the force needed to widen the distance between contact portions 8d,8d from length D2 to length D1, the force for closing can be set to a desired value based on the design of the torsion of the spring. The necessity for a large amount of force in this case is ensuring the stability of the holding of transmitter 3 at a specific angle. By means of this large rotational force for closing, contact portions 8d,8d transit suddenly from a state of planar contact with holding surfaces 10b,10b to a state of linear contact with arced surfaces 10c,10c.

(6) Transition from position B to position A (closing)

The operational mechanism to move transmitter 3 from position B to position A (closed) differs from the mechanism for opening the transmitter from position A to position B only with respect to the direction of rotation. Namely, spring 8 rotates in a clockwise direction as contact portions 8d,8d remain in contact with arced surfaces 10c,10c, gripping cam 10 therebetween. The curving arc shape of arced surface 10c also enables rotation to be smoothly performed at this point.

To summarize the above described opening and closing operation, a constant rotational force is applied to move transmitter 3 from position A to position B, after which the application of a slight amount of rotational force causes the transmitter to transit suddenly from position B to position C, that is to say, the open state. Further, since the open state wherein transmitter 3 is at position C shown in FIG. 2 is stable, a large amount of rotational force is required to close transmitter 3. In the closing operation, a large force brings transmitter 3 a sudden transition from position C to position B, and then a constant force is applied to smoothly carry out the closing operation from position B to position A. In other words, when hinge device 5 is employed, the opening and closing operation is carried out easily and smoothly to transmitter 3, while, in addition, transmitter 3 can be held open with surety and stability at a specific angle (open state).

Hinge device 5 is comprised of two hinge main bodies 6,6. These hinge main bodies 6,6 are disposed to the respective ends of lateral edge 4 of operational member 2, to which transmitter 3 is connected, along the longitudinal direction thereof. A freely opening and closing connection between transmitter 3 and operational member 2 is provided at these ends solely. Accordingly, space 13 which is positioned at the center of lateral edge 4 can be employed for purposes other than connection, such as, for example, a housing space for wiring or the like, thus contributing to making the device containing the present hinge device more compact.

Further, by setting the angle between holding surfaces 10b,10b to an optional value, the angle to which transmitter 3 is opened can easily be designed to be an optional angle, including a large angle such as 150° as indicated by C' in FIG. 2.

Embodiment 2

Figure 8:
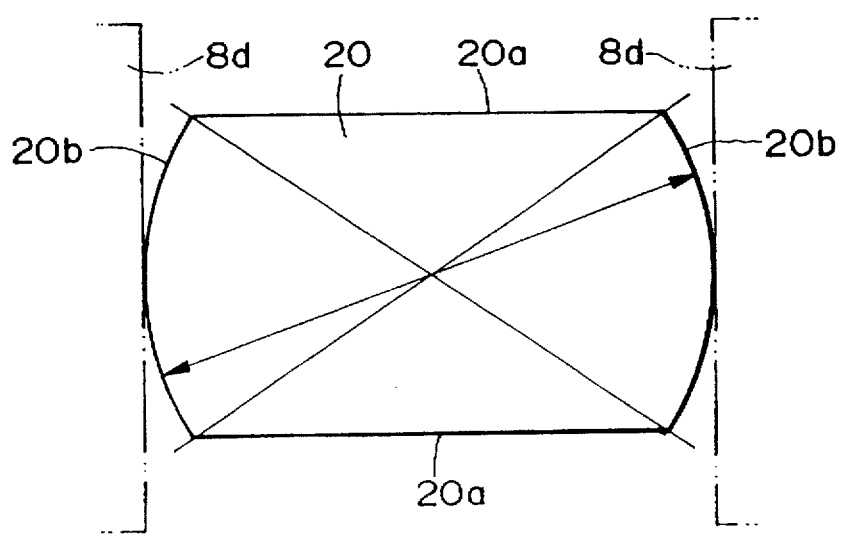
FIG. 8 is a view in lateral cross-section showing the external shape of the cam in the second embodiment of the hinge device of the present invention.

Next, a second embodiment of the hinge device of the present invention will be explained. This embodiment differs from the preceding embodiment only in that a cam 20, the external shape of which is shown in FIG. 8, is employed instead of the cam 10 used in embodiment 1. In all other respects, the structure of this embodiment is the same. Accordingly, only cam 20 will be explained, with an explanation of the other parts omitted for brevity. The structure of cam 20 differs from cam 10 only in that the inclination of holding surfaces 20a differs. Cam 20 is provided with an hole (not shown) identical to that of hole 10a of cam 10, and with arced surfaces 20b (curved surface) identical to arced surfaces 10c of cam 10. Further, assembly of the device in this embodiment may be carried out in the same way as in Embodiment 1.

Figure 9:
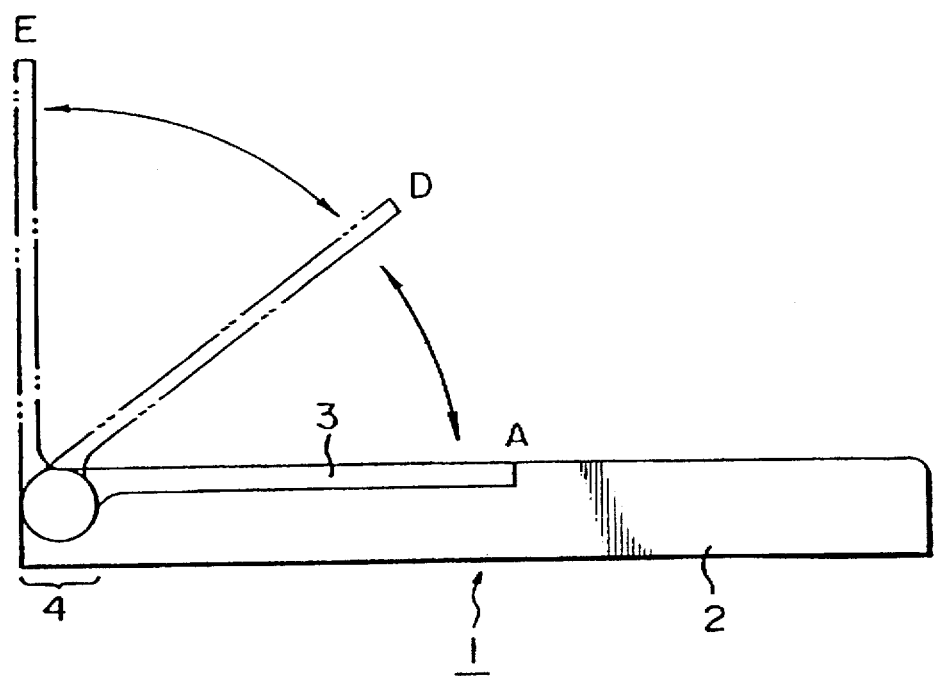
FIG. 9 is a front view showing an example of a cellular telephone employing the second embodiment of the present invention.

The opening and closing operation of transmitter 3 in this embodiment differs in particular from that in embodiment 1 in that the holding angle (corresponding to position E) is 90° as shown in FIG. 9 wherein A, D, and E indicate transitional positions of transmitter 3. In other words, by setting the angle of holding surface 20a of cam 20, the holding angle can be set to a desired value (90° in this embodiment). This contributes to making the device more compact, while providing the same surety and smoothness to the opening and closing operations as that provided in Embodiment 1.

Embodiment 3

Figure 10:
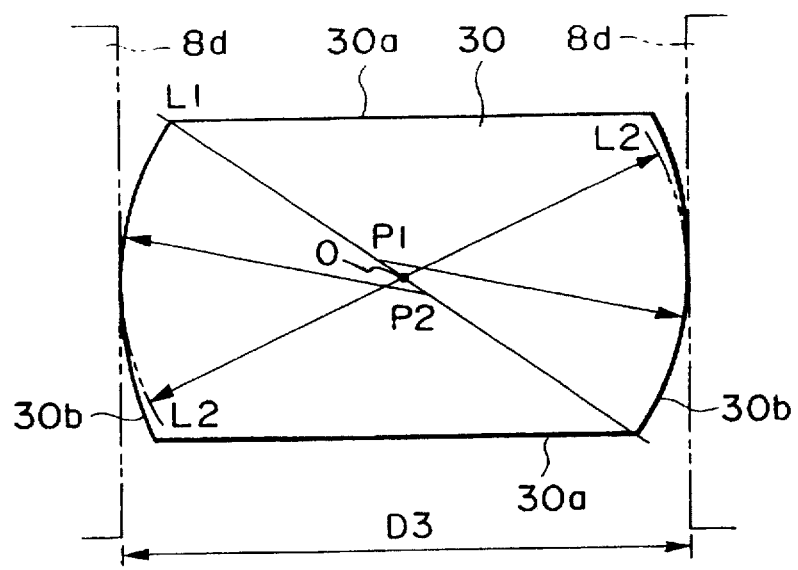
FIG. 10 is a view in lateral cross-section showing the external shape of the cam in the third embodiment of the hinge device of the present invention.

Next, a third embodiment of the hinge device of the present invention will be explained. This embodiment differs from the preceding second embodiment only in that a cam 30, the external shape of which is shown in FIG. 10, is employed in place of cam 20 in embodiment 2. In all other respects, the structure is the same. Accordingly, an explanation will be made of cam 30 only, with an explanation of the other parts omitted for brevity. The structure of cam 30 differs from that of cam 20 only in that the center line of reset force receiving surfaces 30b (curved surface) is different. A hole (not shown) identical to the hole formed in cam 20, and holding surfaces 30a identical to holding surfaces 20a of cam 20 are formed in cam 30. Reset force receiving surfaces 30b,30b are arced surfaces having parallel straight lines P1,P2 as respective center lines, parallel straight lines P1,P2 being in an imaginary plane L1 and eccentric on either side of axis line 0 by equivalent distances. Further, assembly of the device in this embodiment is carried out in the same manner as in Embodiment 1.

Figure 11:
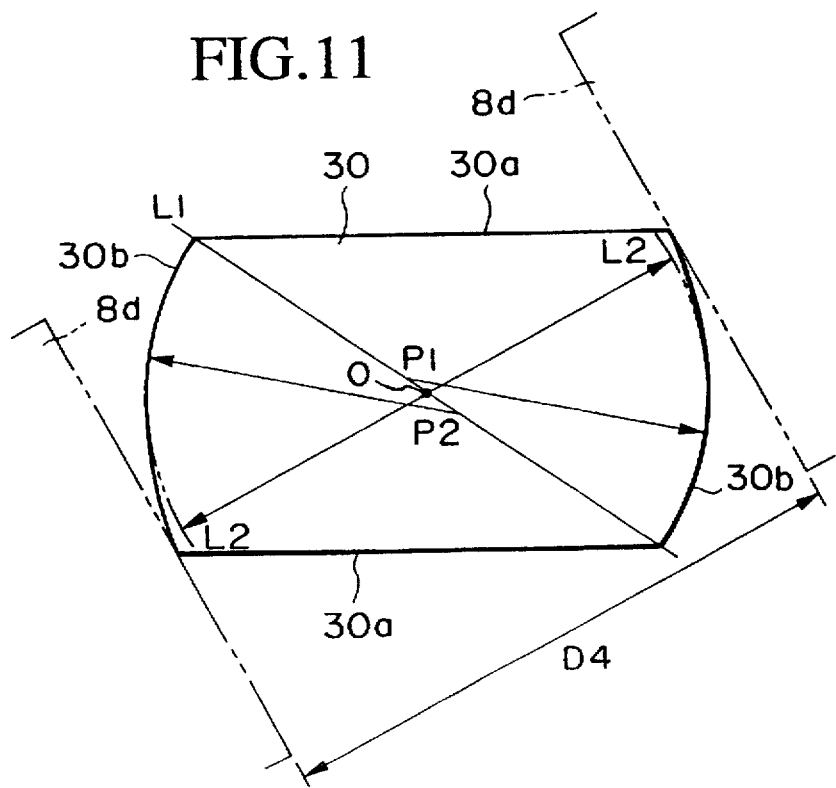
FIG. 11 is an explanatory view showing the positional relationship between the cam and the spring in the cam of the third embodiment of the present invention.

The opening and closing operations of transmitter 3 in this embodiment differ from those in the preceding Embodiment 1 only with respect to movement between A and D in FIG. 9. Accordingly, only this movement will be explained. Reset force receiving surfaces 30b,30b are arced surfaces having straight lines P1,P2 as respective center lines. Thus, reset force receiving surfaces 30b,30b are positioned more external position with respect to the counter-clockwise direction than imaginary arced surfaces L2 centered about axis 0. Accordingly, when an operation is carried out to open transmitter 3 from the closed state, the distance between contact portions 8d,8d of spring 8 widens from length D3 in FIG. 10 to length D4 in FIG. 11. Thus, a reset force to move the transmitter 3 to a closed state is stored in spring 8 when the transmitter is in the state shown in FIG. 11. For this reason, transmitter 3 is not held open at some intermediate angle between its closed state at position A and position D and the transmitter automatically returns to a closed state.

Further, the operation of holding transmitter 3 open stably is identical to that in Embodiment 2.

Figure 12:
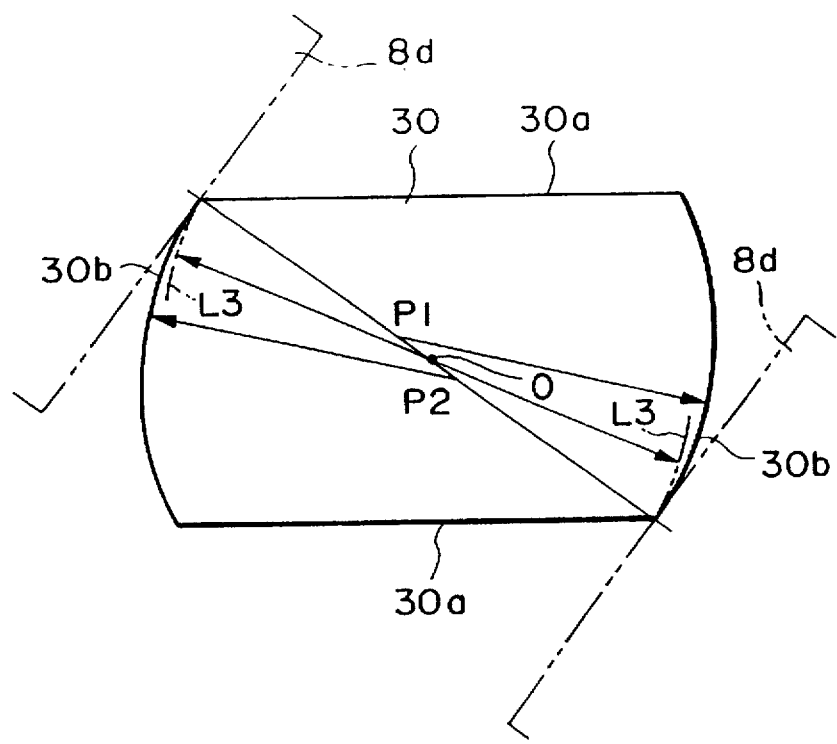
FIG. 12 is another explanatory view showing the positional relationship between the cam and the spring in the cam of the third embodiment of the present invention.

Further, when an operation is carried out to open the transmitter beyond the open state indicated by E in FIG. 9, contact portions 8d,8d of spring 8 move from a state of planar contact with holding surfaces 30a,30a to a state of linear contact with reset force receiving surfaces 30b,30b. In other words, the device passes through the state shown in FIG. 12. Since reset force receiving surfaces 30b are positioned further to the outside than imaginary arced surfaces L3 centered about axis 0, the space between contact portions 8d,8d widens accompanying the operation to open transmitter 3 beyond the state shown in FIG. 12, namely, accompanying the rotation of spring 8 in the counter-clockwise direction. Thus, a reset force in the clockwise direction is stored in spring 8. Accordingly, even if an operation to open transmitter 3 beyond the open state at position E is carried out on the device, the reset force returns spring 8 to the state shown in FIG. 12 once the opening operation ceases, and the transmitter 3 again returns to the open state due to the inertia to return to the state shown in FIG. 12. As a result of the above, transmitter 3 is maintained in either a closed state (A in FIG. 9) or an open state (E in FIG. 9), and does not enter an intermediate, or half-open, state wherein the transmitter is held open at some intermediate position which is at other than the desired angle.

Further, this embodiment is similar to that of Embodiment 2 in that the design contributes to making the device containing the present hinge device more compact and in that the device can be opened and closed smoothly and with surety.

Embodiment 4

Figure 13:
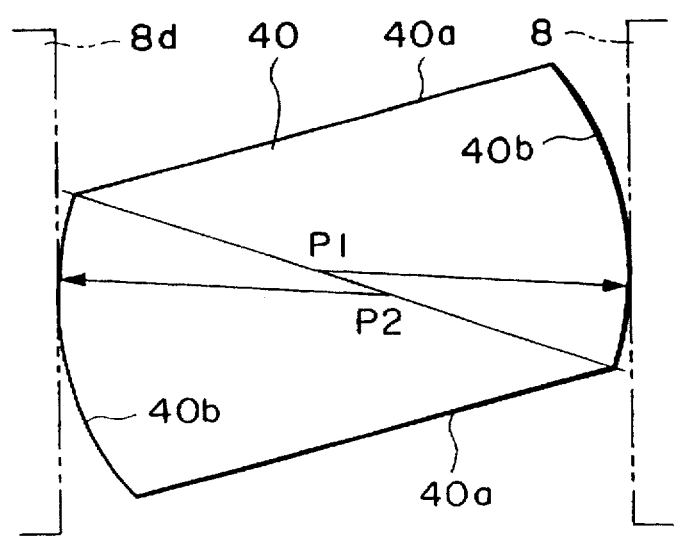
FIG. 13 is a view in lateral cross-section showing the external shape of the cam in the fourth embodiment of the hinge device of the present invention.

A fourth embodiment of the hinge device of the present invention will now be explained. This embodiment differs from the first embodiment only in that a cam 40, the external shape of which is shown in FIG. 13, is employed in place of the cam 10 used in Embodiment 1. Other structures are the same. Thus, an explanation will be made of cam 40 only, with an explanation of the other parts omitted here for brevity. Cam 40 is comprised of a hole (not shown in the figures) identical to that of hole 10a of cam 10, holding surfaces 40a identical to holding surfaces 10b of cam 10, and reset force receiving surfaces 40b (curved surface) identical to the reset force receiving surfaces 30b of cam 30.

In other words, this embodiment has a structure which incorporates the characteristic aspects of the first and third embodiments. Accordingly, as explained in Embodiment 1, this contributes to making the device more compact, while permitting the opening and closing operation to be carried out smoothly and with surety. Further, the holding angle of transmitter 3 can be set to a desired value by optionally setting the angle of the holding surface 40a. Moreover, as explained in Embodiment 3, transmitter 3 can be held in either a predetermined open state or a predetermined closed state, without entering an intermediate, or half-open, state wherein the transmitter is held open at some intermediate position which is at other than the desired angle.

Embodiment 5

The fifth embodiment of the present invention will now be explained. This embodiment differs from the first embodiment only in that a holding cam 50 and a reset cam 55, the external shapes of the portions held by contact portion 8d of spring 8 being shown in FIGS. 14A and 14B respectively, are employed in place of cam 10 in this embodiment. The remaining structures are identical. An explanation will therefore by made of reset cam 55 and holding cam 50 only, with an explanation of the other parts omitted here for brevity.

Holding cam 50 and reset cam 55 are disposed to the respective ends of lateral edge 4, and differ in respect to the shape in cross-section of the portions thereof held by contact portion 8d of spring 8.

Holding cam 50 is provided with concave surfaces 50a and reset force receiving surfaces 50b. Concave surface 50a is depressed inward and forms a holding surface at which holding cam 50 is held in a set position by spring 8. Reset force receiving surface 50b receives a rotational force from the elastic reset force of the spring 8 in a direction opposite the rotation of holding cam 50 when it rotates to the left (as shown in the figures) relative to spring 8. In addition, reset force receiving surface 50b is an arced surface having center lines P1,P2 which are eccentric from axis 0 of holding cam 50. Cam 50 principally functions to hold spring 8 in a predetermined position.

Reset cam 55 is provided with reset force receiving surfaces 55b. Reset force receiving surface 55b receives a rotational force from the elastic reset force of spring 8 in a direction opposite the rotation of reset cam 55 when it is rotating to the left (in the figures) relative to spring 8. Further, because reset cam 55 has the shape of a parallelopiped, a large difference in the elastic forces which arise, depending on the position of the spring, can be achieved. In other words, through the provision of a reset cam 55 formed in the shape of a highly compressed parallelopiped, the design of the device permits a large length ratio between length D8 and length D7 to be achieved, and enables the force needed for spring 8 to exceed corner 55c to be set to a large value. Further, corner portions 55c,55d are rounded to guarantee smooth operation. Moreover, reset cam 55 functions primarily to receive the elastic reset force arising from spring 8.

Next, an explanation will be made for each step of the opening and closing operations of transmitter 3 in the case where a holding cam 50 and reset cam 55 are employed.

Figure 14A:
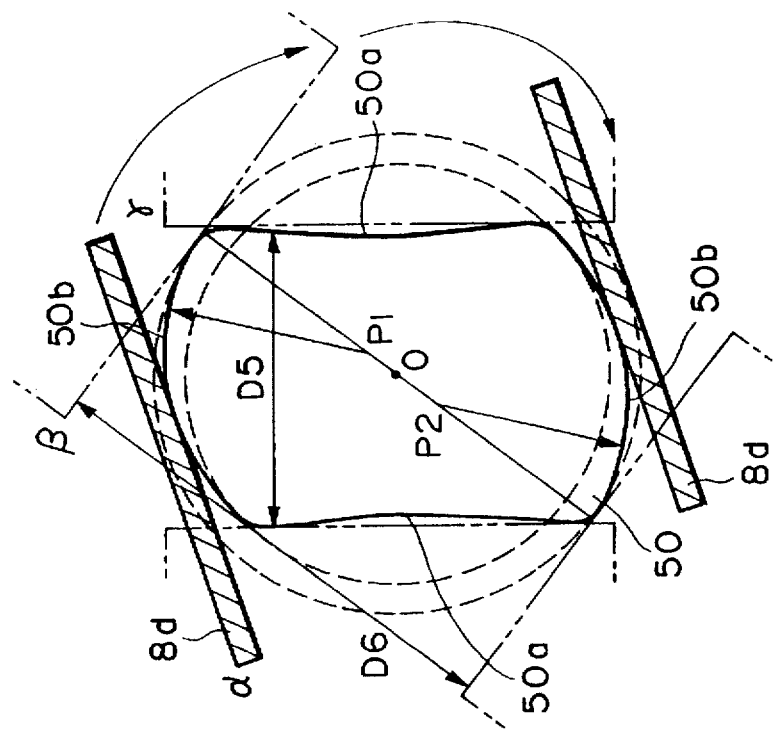
FIGS. 14A and 14B are views in lateral cross-section showing the external shape of the cam in the fifth embodiment of the hinge device of the present invention, and are explanatory views showing the positional relationship between the cam and the spring.
Figure 14B:
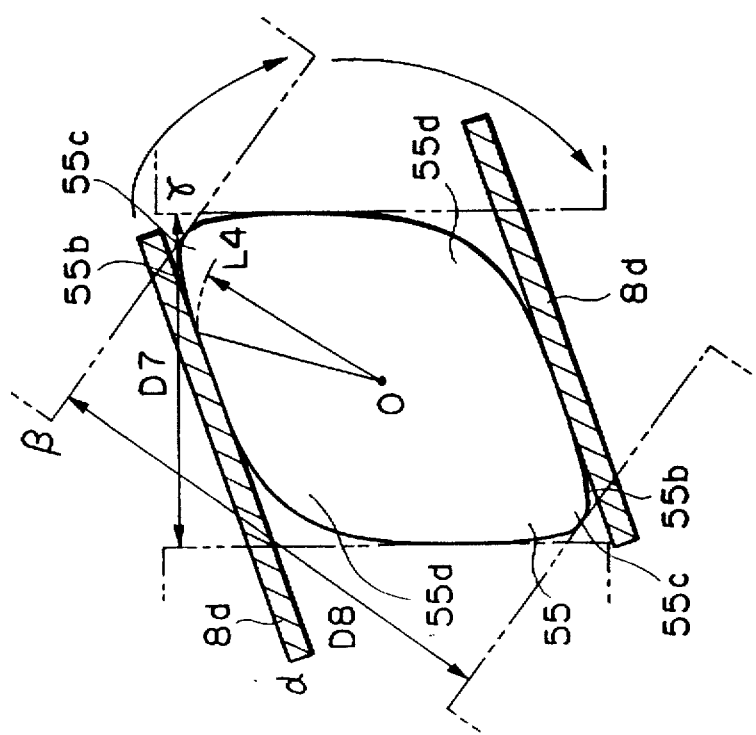
Figure 15:
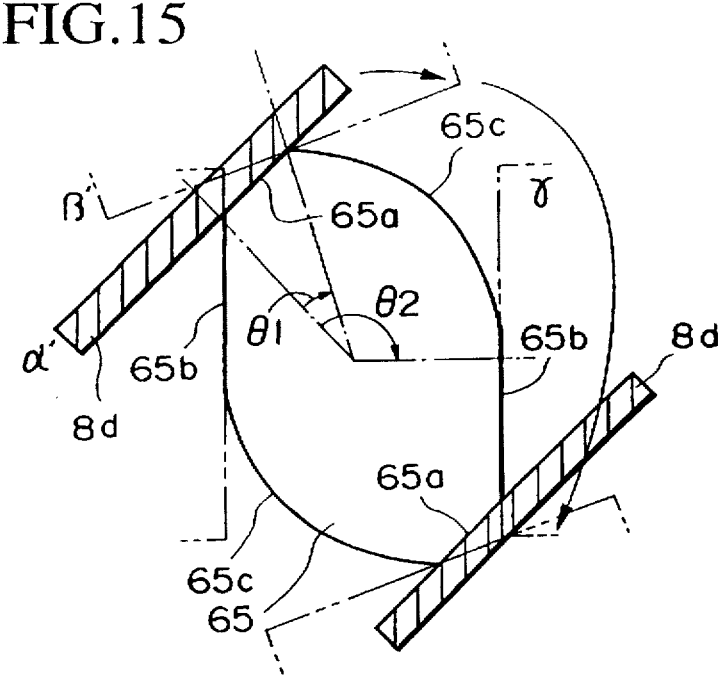
FIG. 15 is a view in lateral cross-section showing the external shape of the cam in the sixth embodiment of the hinge device of the present invention, in addition to being an explanatory view showing the positional relationship between the cam and the spring.
Figure 16:
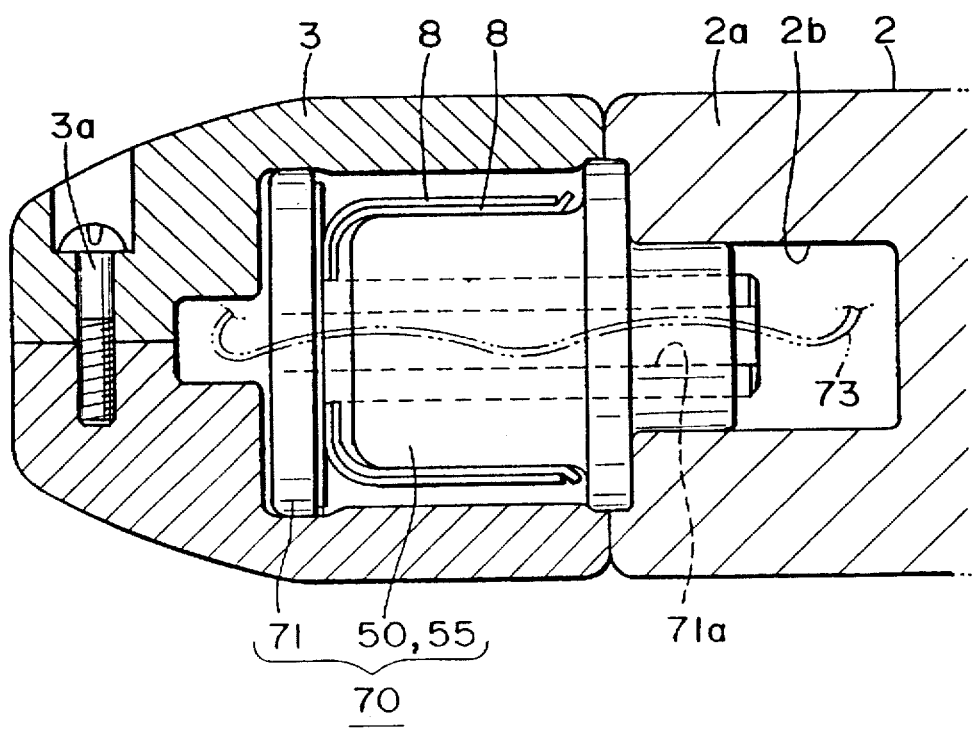
FIG. 16 is a front view showing the hinge device main body in the seventh embodiment of the hinge device of the present invention.

In FIGS. 14A and 14B, $\alpha$ and $\gamma$ respectively correspond to the closed and opened positions of transmitter 3 with respect to operational member 2. $\beta$ indicates an intermediate position along the path extending from $\alpha$ to $\gamma$.

(1) Position $\alpha$ (closed)

Contact portions 8d,8d are in contact with the respective reset force receiving surfaces 50b and 55b of holding cam 50 and reset cam 55 in the closed state indicated by $\alpha$ in FIGS. 14A and 14B.

(2) Transition from position $\alpha$ to position $\beta$ (opening)

When transmitter 3 is opened from a closed state to the state indicated by $\beta$ in FIGS. 14A and 14B, spring 8 rotates to the right (in the figures) as it is gripped with contact remaining between contact portions 8d,8d and the respective reset force receiving surfaces 50b and 55b of holding cam 50 and reset cam 55. When a rotational force is removed before transmitter 3 arrives at $\beta$, transmitter 3 returns to a closed state by the elastic reset force of spring 8.

(3) Transition from position $\beta$ to position $\gamma$ (opening)

When transmitter 3 is opened beyond the position indicated by $\beta$ in FIGS. 14A and 14B, contact portions 8d,8d move from a state of contact with the respective reset force receiving surfaces 50b and 55b of holding cam 50 and reset cam 55, to a state of contact with the concave surface 50a (holding surface) of holding cam 50 and a state of contact with the approximately flat portion of reset cam 55 which is not the holding surface. This transition is carried out suddenly by means of only a slight amount of rotational force. In other words, by applying only a slight amount of rotational force to the state indicated by $\beta$ in FIGS. 14A and 14B, transition to the state indicated by $\gamma$ in FIGS. 14A and 14B is carried out in a single movement.

(4) Position $\gamma$ (open)

In the state $\gamma$ in FIGS. 14A and 14B, contact portions 8d,8d grip concave surfaces 50a,50a of holding cam 50. Thus, transmitter 3 can be held open at a predetermined angle stably and with surety.

(5) Transition from position $\gamma$ to position $\beta$ (closing)

In order to close transmitter 3 from the state indicated by $\gamma$ in FIGS. 14A and 14B, a relatively large force is necessary in response to widening the distance between contact portions 8d,8d from D5 to D6 in holding cam 50, and from D7 to D8 in reset cam 55. The rotational force for closing at this time can be set to the individual desired values for the holding cam 50 and reset cam 55 through the design of spring 8. The need for a large amount of force here is to support the ability to hold transmitter 3 in the open state stably. By means of this large force, contact portions 8d,8d transit from a state of contact with the holding surfaces to a state of contact with the reset force receiving surfaces 50b and 55b suddenly.

(6) Transition from position $\beta$ to $\alpha$ (closing)

When transmitter 3 is moved to the state indicated by $\beta$ in FIGS. 14A and 14B to the closed state indicated by $\alpha$, transmitter 3 will automatically return to a closed state by the elastic reset force of spring 8. That is to say, transmitter 3 will return to a closed state even in the absence of a force of rotation to return it to this state.

To summarize the above described opening and closing operations, a smooth opening operation is carried out from position $\alpha$ to $\beta$ in resistance to the elastic reset force of the spring 8, with transition from $\beta$ to the open state of $\gamma$ being accomplished suddenly through the application of only a slight amount of rotational force. Further, when a rotational force is removed prior to reaching the positional state indicated by $\beta$, transmitter 3 returns to a closed state by the elastic reset force of the spring 8. Transmitter 3 is stable in the open state, with a relatively large force being required to close it. When a large force is applied to close transmitter 3, the transmitter 3 moves suddenly from the positional state indicated by $\gamma$ to that indicated by $\beta$, with the transition from $\beta$ to the closed state $\alpha$ occurring automatically by the elastic reset force of the spring 8. In other words, the opening and closing operations are carried out smoothly and easily, and transmitter 3 can be held open at a predetermined angle stably and with surety, without remaining a half-open state at an intermediate position between $\alpha$ and $\beta$.

In the present embodiment, holding cam 50 and reset cam 55, which are disposed at either end of lateral edge 4, differ from each other with respect to the shape in cross-section of the portion gripped by spring 8. For this reason, greater flexibility can be imparted to the characteristics of the movement of the opening and closing operations. This would include, for example, allowing a wider range of options with respect to the setting of the holding angle, the rotational force required in the opening and closing operation, etc. In other words, the design of this embodiment provides a reliable holding function by means of concave surface 50a of holding cam 50, while preventing transmitter 3 from entering a half-open state through the employment of the reset force receiving surface 55b of reset cam 55. Thus, by providing cams which differ from each other with respect to their shapes in cross-section, different functions can be obtained in a single hinge device 5 simultaneously.

Embodiment 6

A sixth embodiment of the present invention will now be explained. This embodiment differs from Embodiment 5 only in that a reset cam 65 is employed in place of reset cam 55. All other structures are the same. An explanation will therefore be made here of reset cam 65 only, with an explanation of the other structures omitted for brevity.

Reset cam 65 is provided with holding surfaces 65a,65b, which comprise flat surfaces, the edges of holding surfaces 65a and 65b connected by means of reset force receiving surface 65c.

Because of its location at a more internal position than the arced surface having axis 0 at its center, reset force receiving surface 65c has a rotation accelerating function which provides an accelerating force to the relative rotation of spring 8 by means of the spring's elastic reset force when spring 8 is rotated to the right (in the figures) relative to reset force receiving surface 65c. Further, if the relative rotation of spring 8 is in the opposite direction, then reset force receiving surface 65c receives a reset force, preventing transmitter 3 from remaining a half-open state.

By employing holding cam 50 and reset cam 65, opening and closing operations in a manner similar to that of the above Embodiment 5 are carried out.

The principal differences relative to the Embodiment 5, however, are that spring 8 is held by holding surfaces 65a when transmitter 3 is in closed state α', and that spring 8 is held by holding surfaces 50a,65b when transmitter 3 is in open state γ wherein the rotation angle is θ2 (in this embodiment θ2=150°) by means of the acceleration function of reset force receiving surface 65c when the rotation angle exceeds β', corresponding to θ1 (in this embodiment, θ1=30°). In other words, the opening operation from θ1 to θ2 is carried out suddenly through the application of a slight amount of force, in this case, the addition of acceleration effect makes the opening operation easier. Further, when closing transmitter 3, reset force receiving surface 65c displays a function to prevent the transmitter from remaining in a half-open state.

Opening and closing characteristics different from those in Embodiment 5 are realized in this embodiment. Namely, by employing two cams at either end of lateral edge 4 which differ from each other with respect to their shape in cross-section, greater flexibility can be imparted to the opening and closing characteristics, while increasing freedom of design.

Embodiment 7

Figure 18:
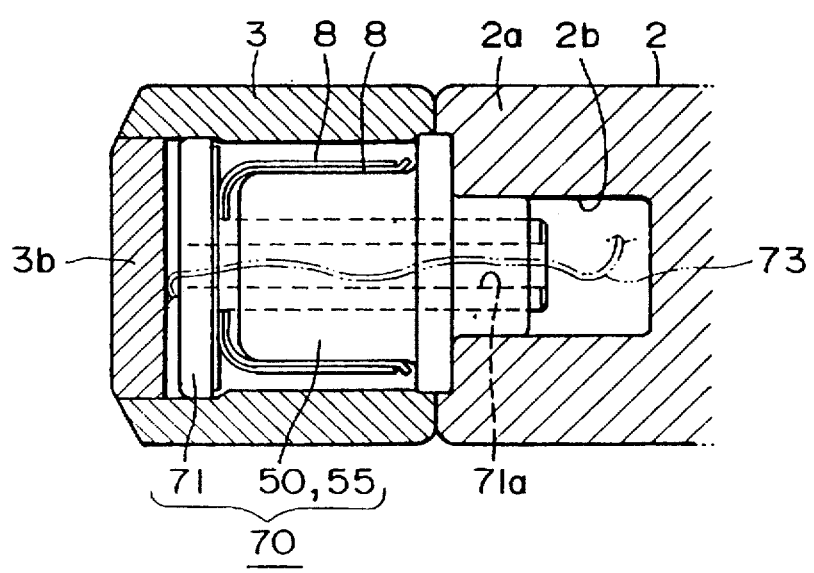
FIG. 18 is a front view showing the hinge device main body in the eighth embodiment of the hinge device of the present invention.

A seventh embodiment of the present invention shown in FIG. 18 will now be explained. This embodiment differs from Embodiment 6 in that holding cam 50 and reset cam 55 are supported by a shaft 71 which is made of a synthetic resin, for example, and comprises a through hole 71a. One cam shaft 70 is formed by holding cam 50 and shaft 71, and the other cam shaft 70 is formed by reset cam 55 and shaft 71. In addition, a duplex of springs 8 is provided to supply a stronger elastic force. In this case, cam shaft 70 is engagingly into hole 2b of attached wall 2a to attach it to operational member 2. Springs 8,8 are attached to transmitter 3. Transmitter 3 is divided into two portions, which are held together by means of a screw 3a.

Figure 17:
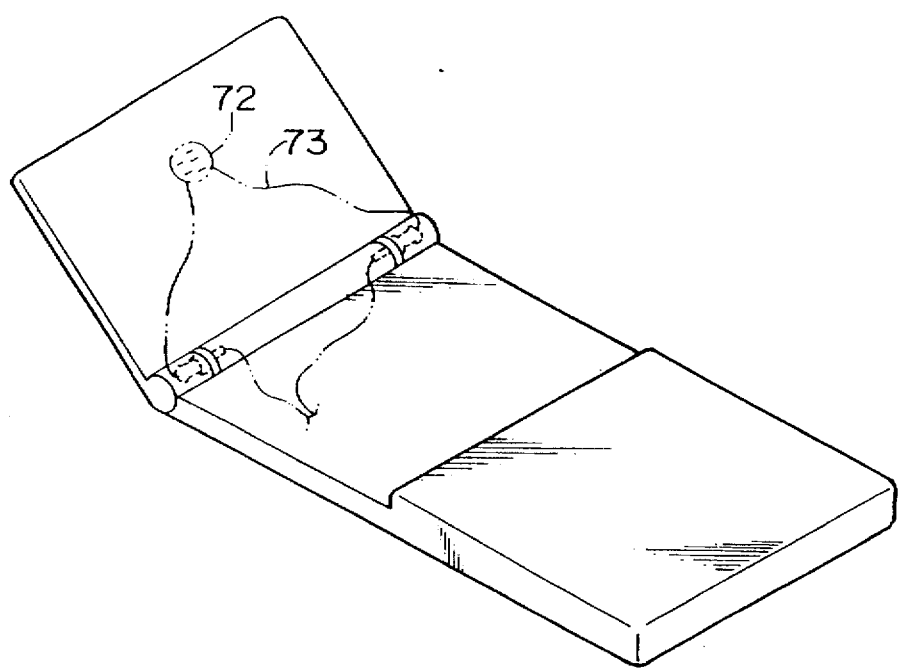
FIG. 17 is a view showing an example of a cellular telephone employing the seventh embodiment of the present invention.

In this embodiment, in addition to the effects offered in the sixth embodiment, through hole 71a can be employed for a purpose other than connection, such as, for example, a housing space for wiring. Thus, this facilitates a more compact design for the device. Further, as shown in FIG. 17, when through hole 71a is employed as a space for housing wiring 73, which is provided extending between operational member 2 and transmitter 3, for a transmission microphone 72 in transmitter 3, wire 73 is not exposed. Thus, this feature contributes to improving the aesthetic appearance of the device containing the present hinge device.

Embodiment 8

An eighth embodiment of the present invention will now be explained. This embodiment differs from Embodiment 7 in that a integral transmitter 3 is employed in place of the structure of Embodiment 7 wherein a transmitter 3 that is positioned in the periphery of holding cam 50 and reset cam 55 is divided into two parts held in place by a screw 3a. In addition, in this embodiment, lid 3b is designed to engage with transmitter 3.

This embodiment offers the same effects as those offered by Embodiment 7.

Figure 19A:
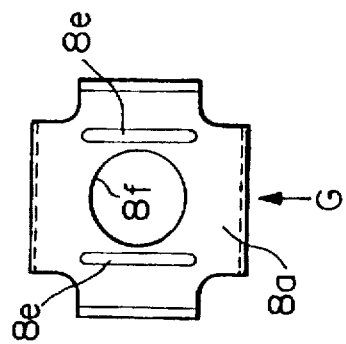
FIG. 19A is a planar view.
Figure 19B:
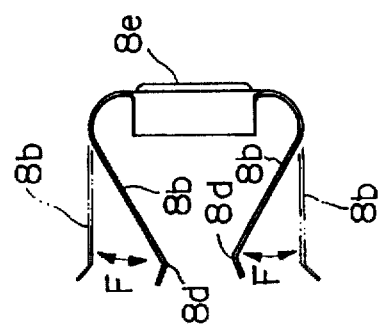
FIG. 19B is a front view and FIG. 19C is a lateral view viewed from the direction indicated by an arrow G in FIG. 19A showing an alternative example of the spring in the hinge device of the present invention.
Figure 19C:
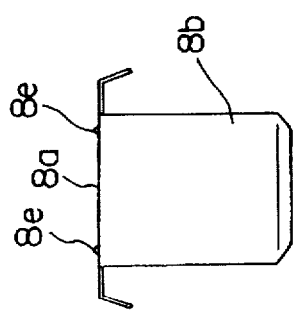

Additionally, it is noted here that in the preceding Embodiments 1 through 8, it is preferable to provide a bead 8e on flat plate 8a, the bead 8e being elongated which extends in a direction to link upright walls 8b,8b and projecting outward from flat plate 8a in an orthogonal direction, as shown in FIGS. 19A, 19B and 19C.

The elongated length of bead 8e is optional, and, for example, may be elongated from opposing edges of flat plate 8a, or may span only the middle region of flat plate 8a as shown in FIGS. 19A, 19B and 19C. In addition, the number of beads 8e provided is also optional, and may be two, as shown in FIGS. 19A, 19B and 19C, one, or three or more. Further, the direction of projection of bead 8e may be oriented opposite upright walls 8b, as in FIGS. 19A, 19B and 19C, or may be oriented in the same direction as upright walls 8b.

By means of the provision of this bead 8e, it is possible to improve the durability of the bending operation which accompanies opening and closing of the device, even in the case where upright walls 8b,8b undergo numerous repetitions of the bending operation in the direction indicated by F in the FIG. 19B. Accordingly, the provision of this bead 8e is preferable. The improvement in durability arises because the provision of bead 8e provides the following characteristics. Namely, it improves the bending strength of flat plate 8a in relation to the bending direction F; it increases the travel distance of a crack in the case where a crack occurs from the periphery of flat plate 8a running in the direction of the center hole 8f; and it supplements a reduction in the strength of flat plate 8a which is provided by the presence of central hole 8f for inserting axis portion 9a of shaft 9.

Furthermore, it is also noted here in the preceding Embodiments 1 through 8, that it is preferable to provide a elongated rib which is elongated along the axis of the cam shaft and projects radially outward from the cam shaft, at a portion of the cam shaft which is attached to attached wall 2a of operational member 2. For example, in the case of the eighth Embodiment, elongated ribs 61 are preferably formed which are elongated along the axis of cams 50,55 and project radially outward, at an engagement portion 60 of cams 50,55 which is attached to attached wall 2a of operational member 2, as shown in FIGS. 20A and 20B. The location, number, and shape of the elongated ribs 61 are optional.

These elongated ribs 61 are formed slightly larger than the internal diameter of hole 2b of attached wall 2a; thus, when engagement portion 60 of cams 50,55 come into engagement with hole 2b of operational member 2, elongated ribs 61 will be somewhat compressed. This produces an effect of fastening the engagement between cams 50,55 and operational member 2.

As described above, by incorporating elongated ribs, attachment of cam shaft to operational member 2 is performed rigidly, and thus, it becomes capable to bear against relatively large loads, and durability is improved.

Of course, the above elongated ribs are applicable to Embodiments 1 through 7, but they are not shown in the figures. For example, in the case of Embodiment 1, in FIG. 4, elongated ribs will be applied to axis region 9b of shaft 9 of cam shaft 7.

Figure 21:
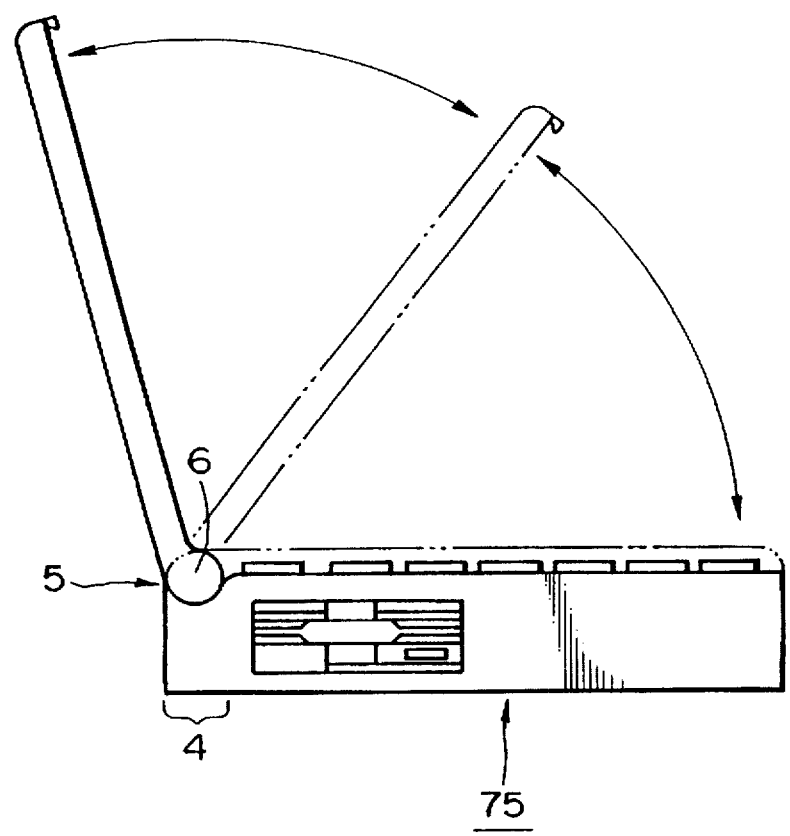
FIG. 21 is a front view showing an example of a laptop computer which employs the hinge device of the present invention.

Further, the preceding embodiments were explained by means of an example employing the hinge device of the present invention in a cellular telephone 1. However, the hinge device of the present invention is in no way limited to this application alone, but may also be employed in a laptop computer 75 such as shown in FIG. 21. In addition, application of the hinge device in other devices such electronic datebooks, toilet seats and the like, is of course possible.

Further, rather than providing cam shafts 7 and 70 to operational member 2 (stationary member) and spring 8 to transmitter 3 (opening-closing member), the cam shaft may instead be provided to the opening-closing member and the spring provided to the stationary member.

In the hinge device of the present invention, the connection between a stationary member and a opening-closing member is carried out by means of two hinge main bodies which are disposed to either end of the lateral edge of stationary member along the longitudinal direction thereof, in order to attach the opening-closing member being attached to the stationary member. Thus, the center region of this lateral edge can be employed for a purpose other than connection, such as, for example, a housing space for wiring. Thus, this design contributes to making the device containing the present hinge device more compact.

When opening or closing the opening-closing member, the cam shaft and spring rotate relative to each other with the spring elastically gripping the cam. As a result, the opening and closing operation of the opening-closing member can be carried out smoothly.

Further, accompanying the opening and closing operation, the cam shaft and spring rotate relative to each other, and the opening-closing member is held at a specific angle stably with the spring gripping the holding surface. Accordingly, the opening and closing operation of the opening-closing member can be carried out with surety.

Moreover, because the holding surface is a flat surface or a concave surface which is depressed inward, the holding of the cam by the spring is realized by means of a simple construction, and the holding of the cam at a specific angle can be carried out with greater surety.

Because the edges of the pair of holding surfaces are joined in a state such that they project to form a convexity, the opening and closing operation of the opening-closing member can be carried out smoothly.

Further, the curved surface is provided with a reset force receiving surface which receives a rotational force in a direction opposite to the direction of the rotation of the cam when the cam rotates relative to the spring due to the elastic reset force of the spring. As a result, when a rotational force is removed at an intermediate point during the opening or closing operation, this reset force receiving surface receives a reset force to return it to its original state due to the elastic reset force of the spring. Thus, the device does not remain in an intermediate, or half-open, state. Accordingly, the opening and closing operation can be carried out with greater surety, while imparting to the device a high level of operability.

Further, because the reset force receiving surface is an arced surface having a center line which is eccentric from the axis of the cam, it is possible to guarantee smooth and easy opening and closing operations that can be realized through a simple construction.

Moreover, because the two cams disposed to either end of the lateral edge are provided with shapes which differ from each other in cross-section, greater flexibility can be imparted to the movement characteristics of the opening and closing operations, these including, for example, the holding angle, number of holding positions, setting of the required rotational force for the opening and closing operation, and the like. Thus, this increases the freedom of design.

Still further, one cam is the holding cam, while the other cam is the reset cam. By providing different functions to the two cams in this way, the characteristics of the opening and closing operation can be increased by giving full play to each of these functions.

Further, because a through hole passing through in the direction of the axis of the cam shaft is formed in the cam shaft, this hole can be employed for a purpose other than connection, such as, for example, a housing space for wiring. Accordingly, this permits the design of a more compact device. Moreover, when this through hole is employed as a housing space for wiring, the wiring is thus not exposed which improves the aesthetic appearance of the device.

What is claimed is:

1. A hinge device connecting an opening-closing member to a lateral edge of a stationary member, said hinge device being positioned on said lateral edge, the hinge device comprising:
   two hinge device main bodies disposed at either end of said lateral edge;
   said hinge device main body comprising:
      a cam shaft provided at each of the hinge device main bodies, said cam shaft being affixed to respectively one of the opening-closing member and the stationary member by positioning the axis of said cam shaft in parallel to the lateral edge, said cam shaft having a cam positioned to extend around the periphery of said axis; and
      a spring provided at each of the hinge device main bodies, said spring being affixed to the one of the opening-closing member and the stationary member to which the cam shaft is not affixed, said spring elastically holding the cam of the cam shaft,
      the cam being provided with a pair of holding surfaces which are disposed symmetrically about the axis, at which the cam is held in a predetermined position by the spring, and
      the holding surfaces being inwardly recessed surfaces forming concave surfaces.

2. A hinge device connecting an opening-closing member to a lateral edge of a stationary member, said hinge device being positioned on said lateral edge, the hinge device comprising:
   two hinge device main bodies disposed at either end of said lateral edge;
   said hinge device main body comprising:
      a cam shaft provided at each of the hinge device main bodies, said cam shaft being affixed to respectively one of the opening-closing member and the stationary member by positioning the axis of said cam shaft in parallel to the lateral edge, said cam shaft having a cam positioned to extend around the periphery of said axis; and
      a spring provided at each of the hinge device main bodies, said spring being affixed to the one of the opening-closing member and the stationary member to which the cam shaft is not affixed, said spring elastically holding the cam of the cam shaft, and
      the cam being provided with a pair of holding surfaces which are disposed symmetrically about the axis, at which the cam is held in a predetermined position by the spring,
      the edges of one holding surface being joined to the edges of the other holding surface to form a convexity defining a pair of curved surfaces disposed symmetrically about the axis, at least a portion of the curved surfaces constituting reset force receiving surfaces which are imparted a rotational force by the elastic restorativity of the spring in a direction opposite to the direcation of rotation of the cam upon siad cam rotating relative to the spring, and in which
      the reset forces receiving surface is an arced surface having a centerline which is eccentric relative to the axis of the cam.

3. A hinge device according to claim 2, wherein the cams which are disposed at the opposite ends of the lateral edge differ from each other with respect to their cross-sectional shapes.

4. A hinge device according to claim 3, wherein one of said cams is a holding cam which possesses the holding surface and thereby is held in a predetermined position by said spring, and the other said cam is a reset cam which possesses the reset force receiving surface and thereby is subjected to the elastic restorative force of the spring.

5. A hinge device according to claim 2, wherein a through hole which extends along the axis is formed in the cam shaft.

* * * * *

(12) REEXAMINATION CERTIFICATE (4430th)
United States Patent
Kubota

(10) Number: US 5,715,575 C1
(45) Certificate Issued: Aug. 28, 2001

(54) HINGE DEVICE

(75) Inventor: Naoki Kubota, Kashiwazaki (JP)

(73) Assignee: Kato Spring Works Co., Ltd., Tokyo (JP)

Reexamination Request:
No. 90/005,650, Feb. 28, 2000

Reexamination Certificate for:
Patent No.: 5,715,575
Issued: Feb. 10, 1998
Appl. No.: 08/607,471
Filed: Feb. 27, 1996

(30) Foreign Application Priority Data

Mar. 13, 1995 (JP) .................................... 7-053050

(51) Int. Cl.$^7$ .................................................. E05C 17/64
(52) U.S. Cl. ................................................ 16/342; 16/336
(58) Field of Search .......................... 16/342, 337, 341, 16/335, 336, 386

(56) References Cited

U.S. PATENT DOCUMENTS 5,257,310  10/1993  Takagi et al. .

FOREIGN PATENT DOCUMENTS

| 53-63652 | 6/1978 | (JP) . |
| 59-10305 | 3/1984 | (JP) . |
| 62-37506 | 2/1987 | (JP) . |
| 62-110524 | 5/1987 | (JP) . |
| 1-147747 | 10/1989 | (JP) . |
| 4-11115 | 5/1992 | (JP) . |
| 06045980 A | 2/1994 | (JP) . |
| 6-45980 | 2/1994 | (JP) . |
| 07133686 A | 5/1995 | (JP) . |
| 10-1996-0005400 | 4/2000 | (KR) . |

Primary Examiner—Chuck Mah

(57) ABSTRACT

The present invention provides a hinge device which permits opening and closing operations to be carried out smoothly and with surety, and which contributes to the design of a more compact device. The hinge device, wherein a transmitter is connected to one lateral edge of an operational member in a freely opening and closing manner, comprises two hinge device main bodies. These hinge device main bodies are disposed to either end of the lateral edge along the longitudinal direction thereof, and are provided with a cam shaft and a spring respectively. The cam shaft is affixed to the operating member by positioning the axis thereof parallel to the lateral edge. In addition, the cam shaft is provided with a cam portion at its axis periphery. A spring is affixed to the transmitter, and the cam portion of the cam shaft is elastically held.

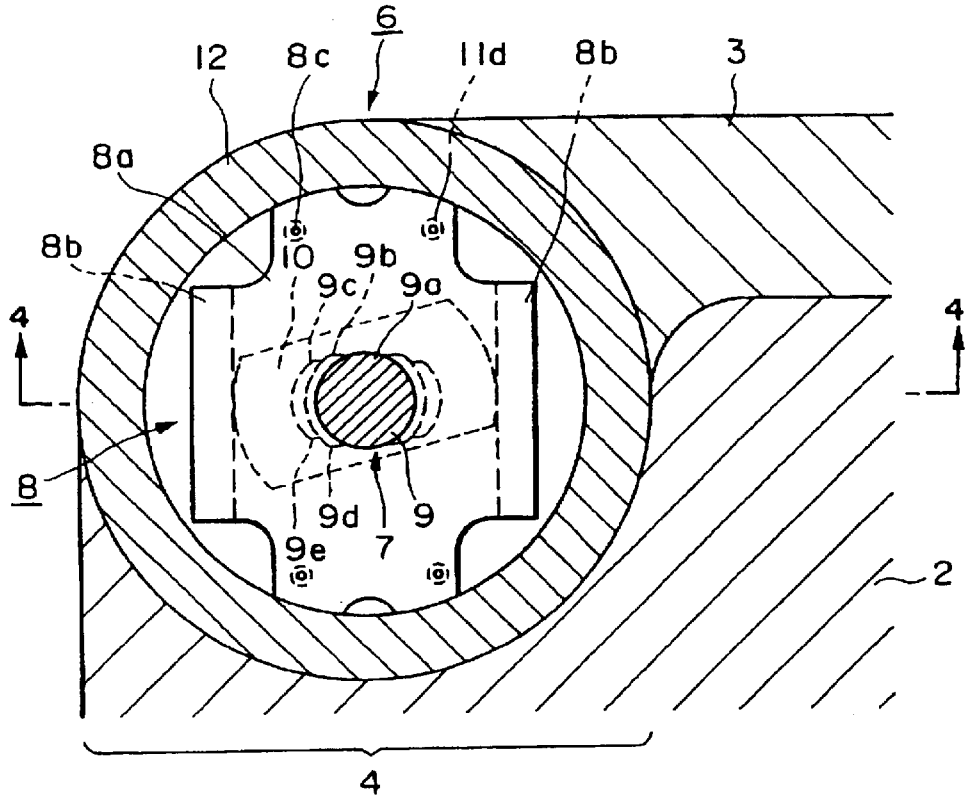

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 1 is confirmed.

Claim 2 is determined to be patentable as amended.

Claims 3–5, dependent on an amended claim, are determined to be patentable.

New claim 6 is added and determined to be patentable.

2. A hinge device connecting an opening-closing member to a lateral edge of a stationary member, said hinge device being positioned on said lateral edge, the hinge device comprising:
two hinge device main bodies disposed at either end of said lateral edge;
said hinge device main body comprising:
a cam shaft provided at each of the hinge device main bodies, said cam shaft being affixed to respectively one of the opening-closing member and the stationary member by positioning the axis of said cam shaft in parallel to the lateral edge, said cam shaft having a cam positioned to extend around the periphery of said axis; and
a spring provided at each of the hinge device main bodies, said spring being affixed to the one of the opening-closing member and the stationary member to which the cam shaft is not affixed, said spring elastically holding the cam of the cam shaft, and
the cam being provided with a pair of holding surfaces which are disposed symmetrically about the axis [at which] *on a substantially central portion of the cam*, the cam [is] *being* held in a predetermined position by the spring,
the edges of one holding surface being joined to the edges of the other holding surface to form a convexity defining a pair of curved surfaces disposed symmetrically about the axis, at least a portion of the curved surfaces constituting reset force receiving surfaces which are imparted a rotational force by the elastic restorativity of the spring in a direction opposite to the [direcation] *direction* of rotation of the cam upon [siad] *said* cam rotating relative to the spring, and in which
the reset force[s] receiving surface is an arced surface having a centerline which is eccentric relative to the axis of the cam;
*the spring comprises a plate and upright walls extending from the ends of the plate and extending along the axis of the cam shaft, the upright walls having contact portions which contact, irrespective of the relative angular orientation between the cam and the spring, a substantially central portion of the cam from the orthogonal direction with the axis of the cam shaft.*

*6. A hinge device connecting an opening-closing member to a lateral edge of a stationary member, said hinge device being positioned on said lateral edge, the hinge device comprising:*
*two hinge device main bodies disposed at either end of said lateral edge;*
*said hinge device main body comprising;*
*a cam shaft provided at each of the hinge device main bodies, said cam shaft being affixed to respectively one of the opening-closing member and the stationary member by positioning the axis of said cam shaft in parallel to the lateral edge, said cam shaft having a cam positioned to extend around the periphery of said axis; and*
*a spring provided at each of the hinge device main bodies, said spring being affixed to one of the opening-closing member and the stationary member to which the cam shaft is not affixed, said spring elastically holding the cam of the cam shaft, wherein*
*the cam being provided with a pair of holding surfaces which are disposed symmetrically about the axis, at which the cam is held in a predetermined position by the spring,*
*the edges of one holding surface being joined to the edges of the other holding surface to form a convexity defining a pair of curved surfaces disposed symmetrically about the axis, at least a portion of the curved surfaces constituting reset force receiving surfaces which are imparted a rotational force by the elastic restorativity of the spring in a direction opposite to the direction of rotation of the cam upon said cam rotating relative to the spring,*
*the reset force receiving surface is an arced surface having a centerline which is eccentric relative to the axis of the cam,*
*the spring comprises a plate and upright walls extending from the ends of the plate and extending along the axis of the cam shaft, the plate is provided with a central hole, and*
*the cam shaft is supported with its one end inserted through the central hole.*

\* \* \* \* \*